United States Patent [19]
Sullivan

[11] Patent Number: 5,456,831
[45] Date of Patent: Oct. 10, 1995

[54] PORTABLE WATER FILTERING DEVICE

[76] Inventor: John L. Sullivan, 235 SW. Le Jeune Rd., Miami, Fla. 33134

[21] Appl. No.: 65,418

[22] Filed: May 24, 1993

[51] Int. Cl.$^6$ .................................................. C02F 9/00
[52] U.S. Cl. ........................... 210/266; 210/282; 210/283
[58] Field of Search ................................. 210/668, 266, 210/282–284, 290, 449, 501

[56] References Cited

U.S. PATENT DOCUMENTS

| | | | |
|---|---|---|---|
| 3,389,803 | 6/1968 | Barley | 210/282 |
| 3,923,665 | 12/1975 | Lambert et al. | 210/501 |
| 4,196,081 | 4/1980 | Pavia | 210/283 |
| 4,298,475 | 11/1981 | Gartner | 210/266 |
| 4,995,976 | 2/1991 | Vermes et al. | 210/282 |
| 5,078,874 | 1/1992 | Sullivan | 210/286 |
| 5,149,437 | 9/1992 | Wilkinson et al. | 210/668 |

Primary Examiner—Ivars Cintins
Attorney, Agent, or Firm—J. Sanchelima

[57] ABSTRACT

A device to filter water having a tubular housing with five chambers therein divided by filter members. The first chamber includes a granular activated carbon filtering medium, the second chamber includes an iodinated anion resin filter medium, the third chamber being empty, the fourth ion includes an anion exchange filtering medium, and the fifth chamber includes a granular activated carbon filtering medium. A faucet adapter is removably connected to the source of water and it is designed to limit the water pressure applied to the device.

8 Claims, 1 Drawing Sheet

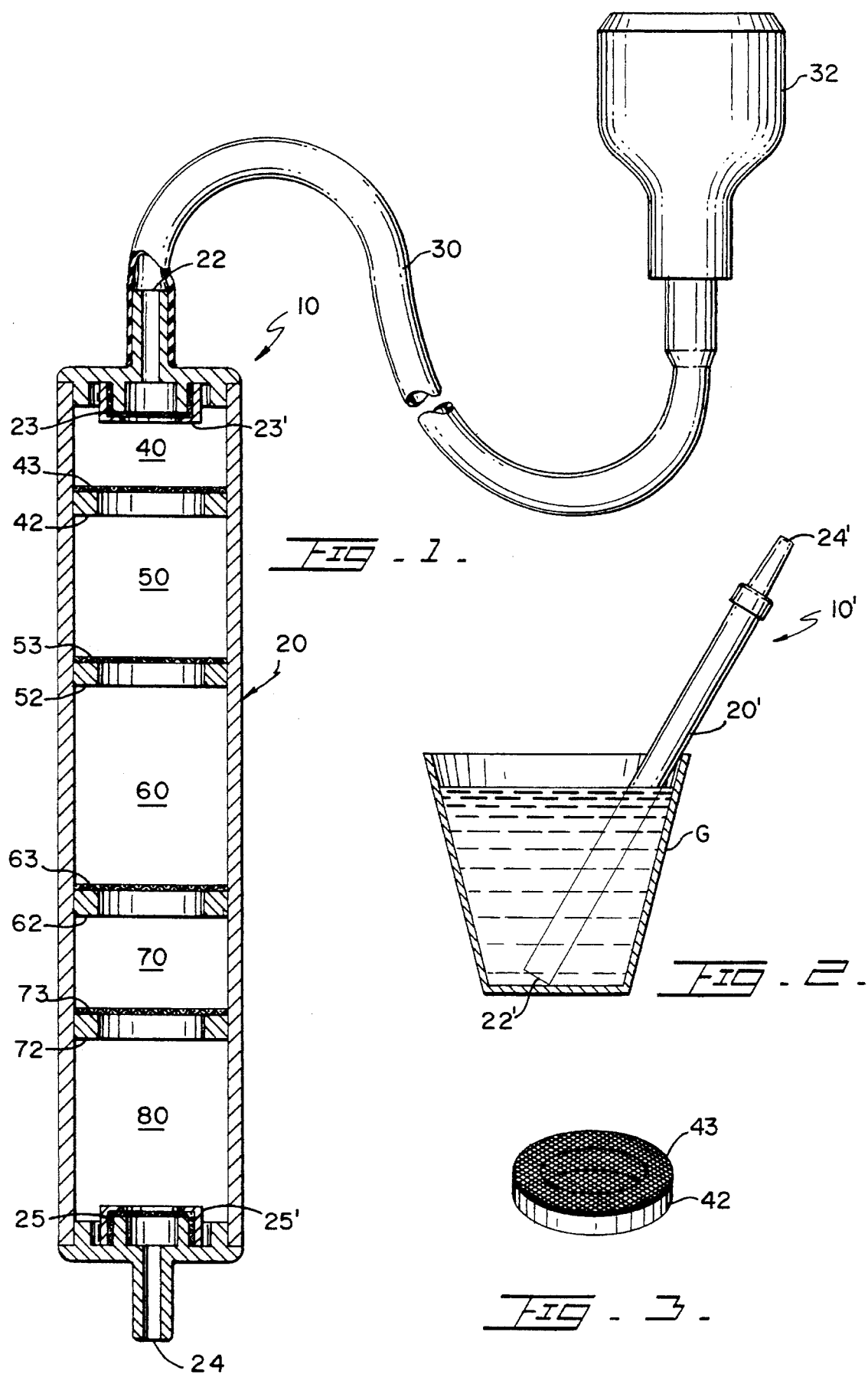

5,456,831

PORTABLE WATER FILTERING DEVICE

BACKGROUND OF THE INVENTION

1. Field of the Invention

The present invention relates to a water filtering device, and more particularly, to such a device that is portable.

2. Description of the Related Art

Applicant believes that the closest reference corresponds to U.S. Pat. No. 5,078,874 issued to this applicant. However, it differs from the present invention because the design and configuration in the present application is more volumetrically efficient and it includes a specific arrangement of filtering media that provides a superior performance, as best described below.

Other patents describing the closest subject matter provide for a number of more or less complicated features that fail to solve the problem in an efficient and economical way. None of these patents suggest the novel features of the present invention.

SUMMARY OF THE INVENTION

It is one of the primary object of the present invention to provide a portable filtering device that can be readily connected to a water faucet and provide good quality filtered water substantially bacteria free.

It is another object of the present invention to provide a filtering device that is volumetrically efficient and that can be readily transported by a user.

It is still another object of the present invention to provide a filtering device that requires a relatively low water pressure to function properly and wherein its filtering media beads can be repositioned through backwashing operations.

It is yet another object of the present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an elevational cross-sectional view of a preferred embodiment of the present invention.

FIG. 2 shows the housing detached from the conduit member as it is used to draw water from a vessel.

FIG. 3 represents one of the filter members including a ring with a press-fitted screen.

DETAILED DESCRIPTION OF THE PREFERRED EMBODIMENT

Referring now to the drawings, where the present invention is generally referred to with numerals 10 and 10', it can be observed that they basically include elongated tubular housings 20 and 20' that include inlet ports 22 and 22' with outlet ports 24 and 24' at their ends. Device 10 is the preferred embodiment which is removably connected to a tap water faucet and device 10' which is used like a straw.

Inlet port 22, as seen FIG. 1, is removably connected to flexible tubular member 30, at one end thereof, and the other end of flexible tubular member 30 includes faucet adapter 32 that can be readily and removably mounted to a conventional faucet that supplies the tap water to be filtered. Portable water filtering device 10, as disclosed in FIG. 2, can also be used as a straw-type filter to draw a liquid from a glass G.

Inside tubular housings 20 and 20' there are five chambers 40; 50; 60; 70 and 80 and they are separated by four filter members 42; 52; 62 and 72 that are press fit to the internal walls of housing 20. These four filter members are preferable made out of Porex material. In a preferred embodiment the filter members are approximately one quarter of an inch thick with porosity of approximately 40 microns. Porex is a trademark of Porex Technologies, Inc., Atlanta, Ga. Over the filter ring members, a nylon or polypropelene screens 43, 53, 63 and 73 are used with a mesh of approximately 30 microns. Inlet and outlet filter members 23 and 25 are preferably mounted adjacent to inlet and outlet ports 22 and 24, respectively, and they are intended to remove any large particles that may be contained in the tap water. Members 23 and 25 are preferably made out of nylon screening with a porosity of approximately 30 microns. Retainer cap members 23' and 25' keep 30 micron screens 23 and 25 mechanically in place.

In device 10', the tubular housing chambers 40, 50, 60, 70 and 80 are identical to those of device 10. The first chamber 40 is filled with GAC (granular activated carbon) filtering media and it acts as a pre-filter to the liquid being processed. The GAC is incorporated to eliminate tri-halomethines (THM), chloroform, chlorine and organic matter from the liquid being processed through the apparatus.

The second chamber 50 is filled with $I_5$ (iodinated anion resin) filtering media. The liquid being filtered through the apparatus enters (Influent) chamber 50 that contains the iodinated resin. As the organisms pass through the chamber, the cell wall is impregnated with $I_5$ ions released by the resin. At the same time, $I_2$ is released into the water to continue washing the cells with a weak iodine solution at a concentration of four ppm.

The third chamber 60 is empty. The water along with the bacteria and any other viruses it may contain now enters into chamber 60 from chamber 50. Chamber 60 is known as a retention or void area. Our tests have shown that it takes a 5 second retention to kill a bacteria concentration of $10^5$ and a ten second retention to kill a bacteria concentration of $10^7$. This retention or void area insures the user that the iodine is in contact with the bacteria for a sufficient duration to insure a complete removal of any harmful bacteria or viruses. Bacteria in nature are rarely found in a concentration greater than $10^3$ unless the water contains raw sewage. As you can see, we want the iodinated products to do more than we state to insure a complete kill and removal and a quality reputation.

The fourth chamber 70 includes a an anion exchange resin. Thus, as shown in FIG. 1, the water flows from the retention area into the anion exchange resin chamber 70 from the water in chamber 60. The anion exchange resin, through ion exchange, removes any possible compounds of iodines that may have formed in the water.

The fifth chamber 80 includes GAC (granular activated carbon) filtering media, as does chamber 40. In addition, chamber 80 is the final chamber incorporated into the filtering process. The chamber 80 is filled with granular activated carbon (GAC) to remove any residual $I_2$ along with reducing organics, color and other tastes from the water. If the water is allowed to enter the anion exchange resin chamber 70 or the GAC chamber 80 too soon or too fast, the iodine could be pulled from the cell walls before a complete removal of the harmful bacteria and/or viruses can be achieved. Depending on the concentration level of bacteria in the liquid, some of the bacteria may survive. The flow rate through the iodinated products must be in direct proportion to the amount of resin and retention/void area to maintain a ten second contact time.

Additionally, a silicon faucet adapter 32 together with a silicone tube 30 is attached to the influent of the travel device whereby the user can maintain control of the water flow. It has been discovered that by incorporating the use of a diverter on the faucet head you can maintain control of flow rates. Portable water filtering device 10 can be provided with an even smaller filter screen of 20 microns that would cause the faucet adapter to pop off sooner if too much pressure flow is applied. In the preferred embodiment, the flow rate is such that it takes at least 12 minutes to process (filter) one gallon of water. This will insure the optimum compromise between greater bacteria killing effect and the desirability of faster water flow.

As shown in FIG. 2, a user can draw the liquid from outlet port 24' by way of inlet port 22' and use the atmospheric pressure to force the water up through tubular housing 20', in portable filtering device 10'. In addition, device 10' includes the same chambers and filtering media as is disclosed in device 10. In sum, device 10' is useful in places where there is no access to pressurized tap water.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A device to filter water removably connected to a supply of low pressure water, comprising:

A. an elongated tubular housing having two ends, an inlet port in one of said ends and an outlet port in the other end, said housing includes four filter members mounted therein thereby defining first, second, third, fourth and fifth chambers; and said first chamber being the one that is adjacent to said inlet port includes a granular activated carbon filtering medium, said second chamber being adjacent to the first chamber includes an iodinated anion resin filter medium, said third chamber, being adjacent to said second chamber, being empty, said fourth chamber, being adjacent to said third chamber, includes an anion exchange resin filtering medium, said fifth chamber, being adjacent to said fourth chamber and to said outlet port, includes a granular activated carbon filtering medium; and B, faucet adapter means for limiting the magnitude of the water pressure applied to said inlet port and said faucet adapter further includes a flexible tubular conduit, having first and second ends, said first end being connected to said faucet adapter means and said second end being removably connected to said inlet port.

2. The device set forth in claim 1 wherein said elongated tubular housing further includes inlet and outlet filtering means adjacent to said inlet and outlet ports.

3. The device set forth in claim 2 wherein said inlet and outlet filtering means have cap members to mechanically keep them in place.

4. The device set forth in claim 3 wherein said filter members and said inlet and outlet filtering means have 30 microns porosity.

5. A device to filter water from a vessel, comprising an elongated tubular housing having an inlet port and an outlet port said housing including four filter members mounted therein thereby defining first, second, third, fourth and fifth chambers, and said first chamber being the one that is adjacent to said inlet port including a granular activated carbon filtering medium, said second chamber, being adjacent to the first chamber, includes an anion resin impregnated with iodine filter medium, said third chamber, being adjacent to said second chamber, is empty, said fourth chamber, being adjacent to said third chamber, including an anion exchange resin filtering medium, said fifth chamber, being adjacent to said fourth chamber and to said outlet port, including a granular activated carbon filtering medium and said outlet port being drawn upon by the suction of a user's mouth and said inlet port being submerged in said water contained in said vessel.

6. The device set forth in claim 5 wherein said elongated tubular housing further includes inlet and outlet filtering means adjacent to said inlet and outlet ports.

7. The device set forth in claim 6 wherein said inlet and outlet filtering means have cap members to mechanically keep them in place.

8. The device set forth in claim 7 wherein said filter members and said inlet and outlet filtering means have 30 microns porosity.

* * * * *